United States Patent
Richards et al.

(10) Patent No.: US 11,741,192 B2
(45) Date of Patent: Aug. 29, 2023

(54) INCREASING TRUST FORMATION AND REDUCE OVERSIGHT COSTS FOR AUTONOMOUS AGENTS

(71) Applicant: International Business Machines Corporation, Armonk, NY (US)

(72) Inventors: John Thomas Richards, Honeoye Falls, NY (US); David John Pirokowski, White Plains, NY (US); Stephanie Houde, Belmont, MA (US); Yunfeng Zhang, Chappaqua, NY (US); Qingzi Liao, White Plains, NY (US); Rachel Katherine Emma Ballamy, Bedford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 359 days.

(21) Appl. No.: 16/775,585

(22) Filed: Jan. 29, 2020

(65) Prior Publication Data
US 2021/0232867 A1    Jul. 29, 2021

(51) Int. Cl.
*G06F 18/21* (2023.01)
*G06F 9/451* (2018.01)
*G06F 9/50* (2006.01)

(52) U.S. Cl.
CPC .......... *G06F 18/2178* (2023.01); *G06F 9/453* (2018.02); *G06F 9/5072* (2013.01)

(58) Field of Classification Search
CPC ..... G06K 9/6263; G06F 9/453; G06F 9/5072; G06F 18/2178

USPC .......................................................... 706/12
See application file for complete search history.

(56) References Cited

U.S. PATENT DOCUMENTS

| 8,842,841 B2 * | 9/2014 | Hook | H04L 63/061 380/278 |
|---|---|---|---|
| 2012/0054142 A1 * | 3/2012 | Du | G06N 5/02 706/47 |
| 2013/0111553 A1 * | 5/2013 | Jacobs | H04L 63/20 726/3 |
| 2013/0345875 A1 * | 12/2013 | Brooks | B25J 9/1671 700/258 |
| 2014/0371907 A1 * | 12/2014 | Passot | G06N 3/008 700/257 |
| 2015/0106308 A1 * | 4/2015 | Harrison | G06N 5/043 706/12 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Seth A Silverman
(74) *Attorney, Agent, or Firm* — Peter Edwards; McGinn IP Law Group, PLLC

(57) ABSTRACT

An autonomous agent operating method, system, and computer program product, including configuring an autonomous agent for a task, launching the autonomous agent with an initial update interval, the update interval determining a frequency of the autonomous agent reporting results to a human user for review, measuring the trust level of human user in a performance of the autonomous agent, and dynamically adjusting the update interval based on this measured trust.

14 Claims, 6 Drawing Sheets

(56) References Cited

U.S. PATENT DOCUMENTS

| | | | | |
|---|---|---|---|---|
| 2016/0034305 A1* | 2/2016 | Shear | ................... | H04L 47/70 |
| | | | | 707/722 |
| 2017/0061285 A1* | 3/2017 | Hikone | ................ | G06N 20/00 |
| 2019/0308315 A1* | 10/2019 | Radrich | ................ | B25J 9/163 |
| 2020/0027124 A1* | 1/2020 | Knodel | ................ | G06N 20/00 |

OTHER PUBLICATIONS

Atkinson, DJ. et al.; "Autonomous Agents and Human Interpersonal Trust: Can We Engineer a Human-Machine Social Interface for Trust?" Association for Advancement of Artificial Intelligence, 2013.

Freedy, A. et al.; "Measurement of Trust in Human-Robot Collaboration" IEEE Xplore, Jun. 2007.

Authors, et al.: Disclosed Anonymously: "Finessing Trust Models for Unknown Servers" IPCOM000227842D; May 21, 2013.

Authors, et al.: Disclosed Anonymously: "Dynamic Adjustment of Business Processes Using Analytics of Aggregated Social Confidence" | IPCOM000238769D; Sep. 17, 2014.

Authors, et al.: Disclosed Anonymously: "Trust Score: a Method to Motivate Employees to Optimize Cloud Asset Utilization" IPCOM000250333D; Jun. 29, 2017.

Sycara, K. et al.; "Integrating Intelligent Agents Into Human Teams".

* cited by examiner

INCREASING TRUST FORMATION AND REDUCE OVERSIGHT COSTS FOR AUTONOMOUS AGENTS

BACKGROUND

The present invention relates generally to an autonomous agent operating method, and more particularly, but not by way of limitation, to a system, method, and computer program product for increasing trust formation and reducing oversight costs for autonomous agents.

Autonomous agents can perform long running tasks on behalf of a human user (e.g. search, service procurement, automatic bidding, resource scheduling, etc.). Once launched, the agent's behavior is often not visible until results are returned or the human engages in active inspection of current agent state. This can reduce the trust that the human owner has in the agent.

To compensate for this, an agent can be programmed to give frequent status updates on task progress (e.g., number of sites explored, number of contracts pending, amount of capital remaining for resource purchase, etc.).

While frequent status updates can increase trust, this can lead to high monitoring costs for the human owner and an erosion of the perceived value of agent autonomy. Conversely, infrequent status updates reduce the cost of monitoring but can lead to both reductions in trust and ultimately suboptimal results since there are fewer opportunities for corrective actions by the human owner.

Balancing this tradeoff properly over time can maximize trust while minimizing the overhead of providing oversight. Thereby, the inventors have identified a need in the art that requires a mechanism for predicting/monitoring trust and adjusting update frequency over time.

SUMMARY

In an exemplary embodiment, the present invention provides a computer-implemented autonomous agent operating method, the method including configuring an autonomous agent for a task, launching the autonomous agent with an initial update interval, the initial update interval determining an initial frequency of the autonomous agent reporting results to a human user for review, and measuring a trust level of human user in a performance of the autonomous agent.

In another exemplary embodiment, the present invention provides a computer program product for autonomous agent operating, the computer program product comprising a computer-readable storage medium having program instructions embodied therewith, the program instructions executable by a computer to cause the computer to perform: configuring an autonomous agent for a task, launching the autonomous agent with an initial update interval, the initial update interval determining an initial frequency of the autonomous agent reporting results to a human user for review, and measuring a trust level of human user in a performance of the autonomous agent.

In another exemplary embodiment, the present invention provides an autonomous agent operating system, the system including a processor, and a memory, the memory storing instructions to cause the processor to perform: configuring an autonomous agent for a task, launching the autonomous agent with an initial update interval, the initial update interval determining an initial frequency of the autonomous agent reporting results to a human user for review, and measuring a trust level of human user in a performance of the autonomous agent.

Autonomous agents will increasingly take on tasks formerly requiring human action. Therefore, maximizing trust in these agents will lead to increased adoption and use. And, effective management of these agents will optimize results while minimizing interruptions and monitoring costs. Thereby, the invention can reduce oversight costs associated with monitoring agents in long running tasks.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
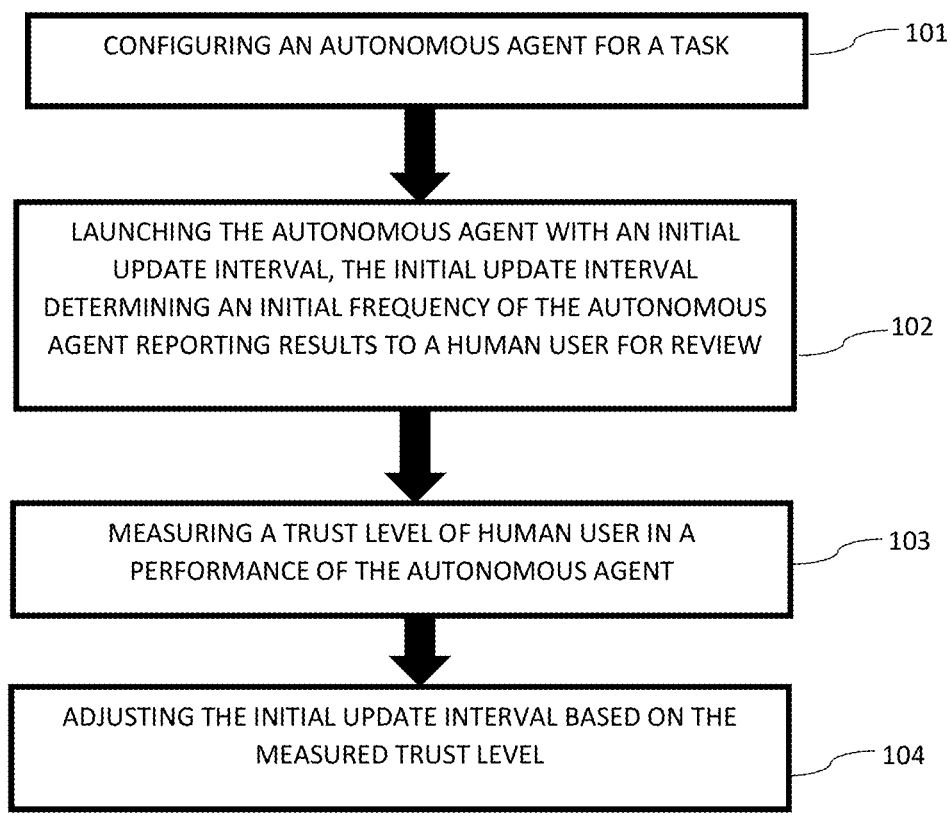
FIG. 1 exemplarily shows a high-level flow chart for an autonomous agent operating method 100 according to an embodiment of the present invention.

The invention will now be described with reference to FIGS. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of an autonomous agent operating method 100 according to the present invention can include various steps for autonomous agents providing updates to their human owner or adjusting how and when these updates are performed.

Figure 4:
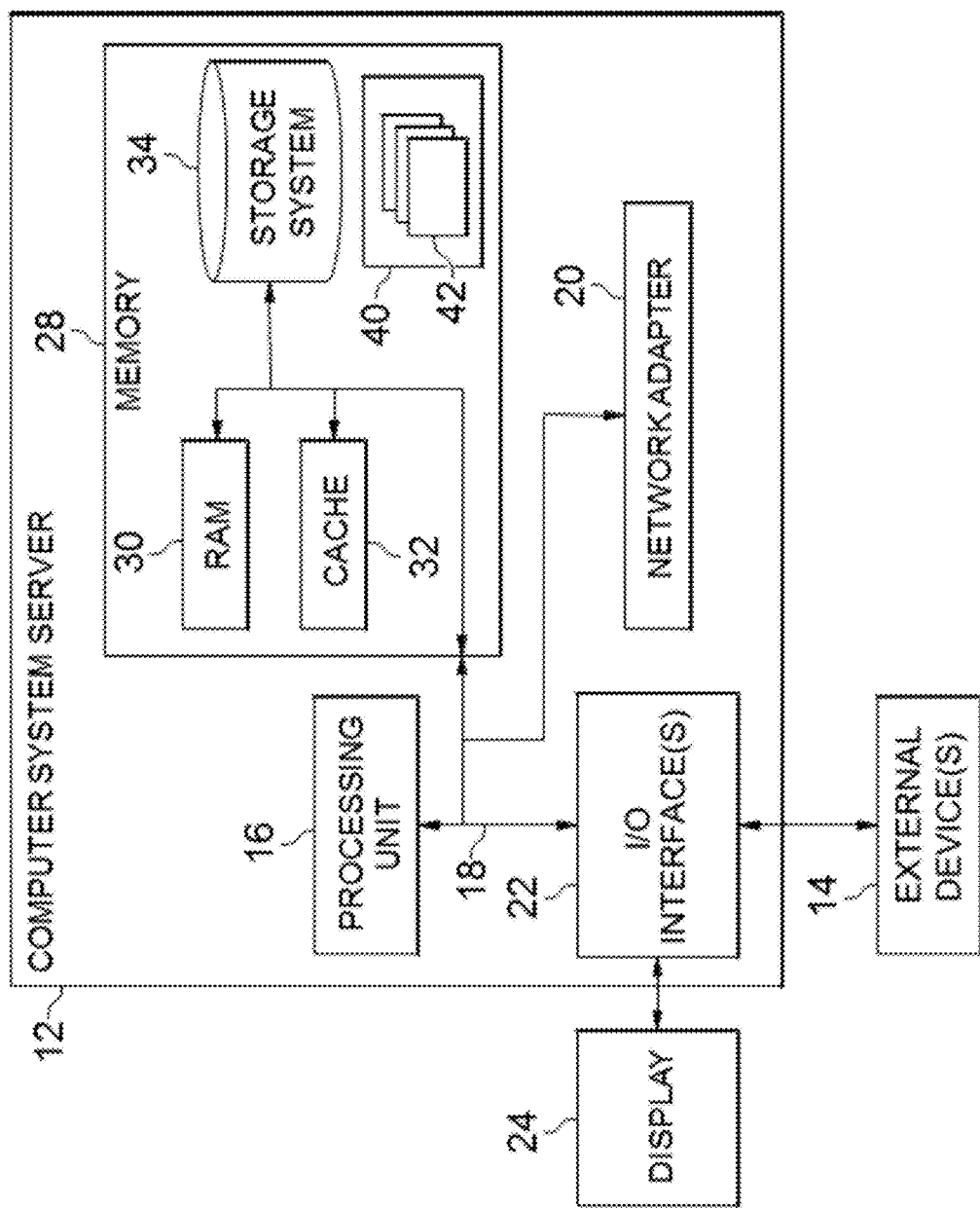
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 6), it is nonetheless understood that the present invention can be implemented outside of the cloud environment.

Figure 2:
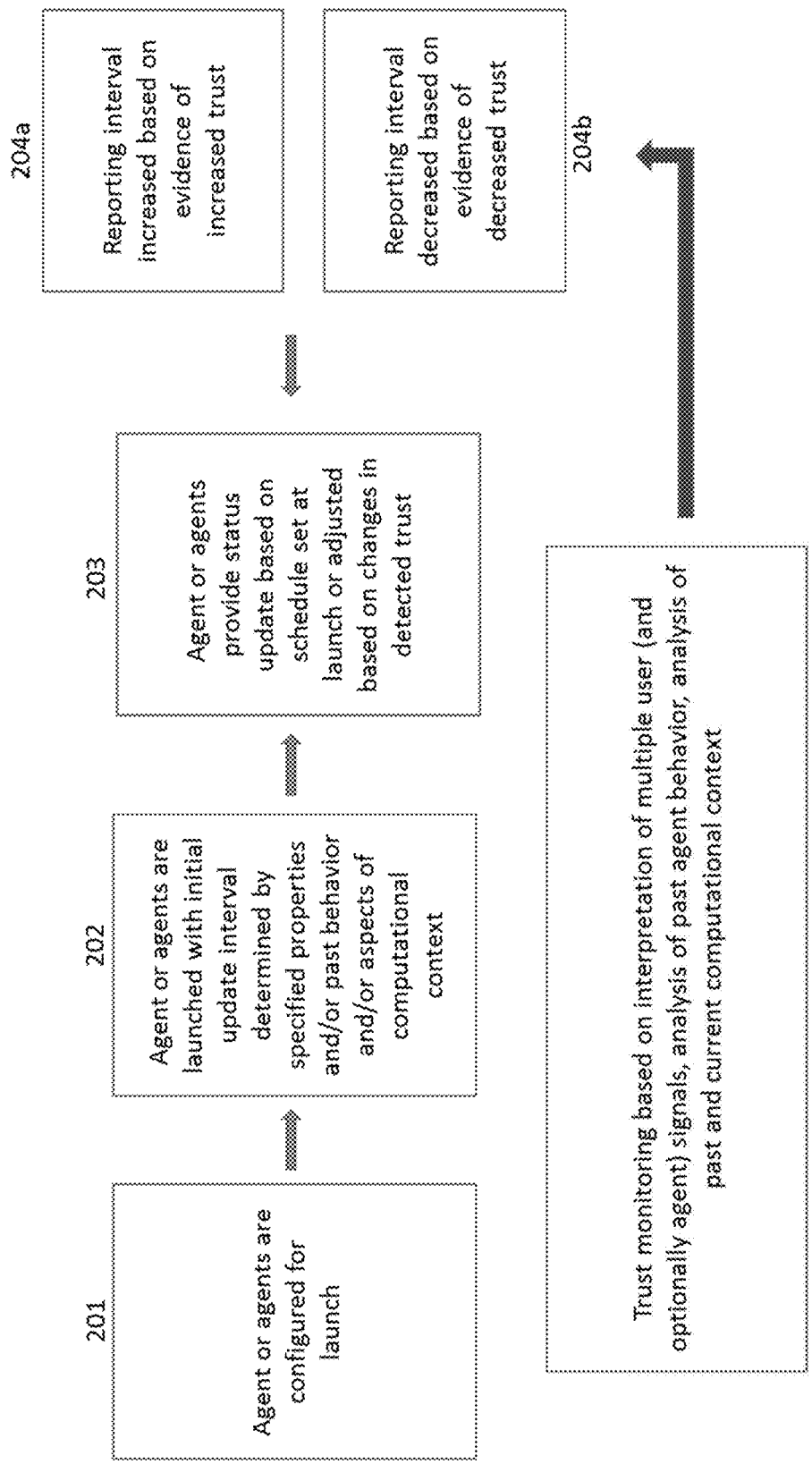
FIG. 2 exemplarily depicts a system implementation of method 100 according to an embodiment of the present invention.
Figure 3:
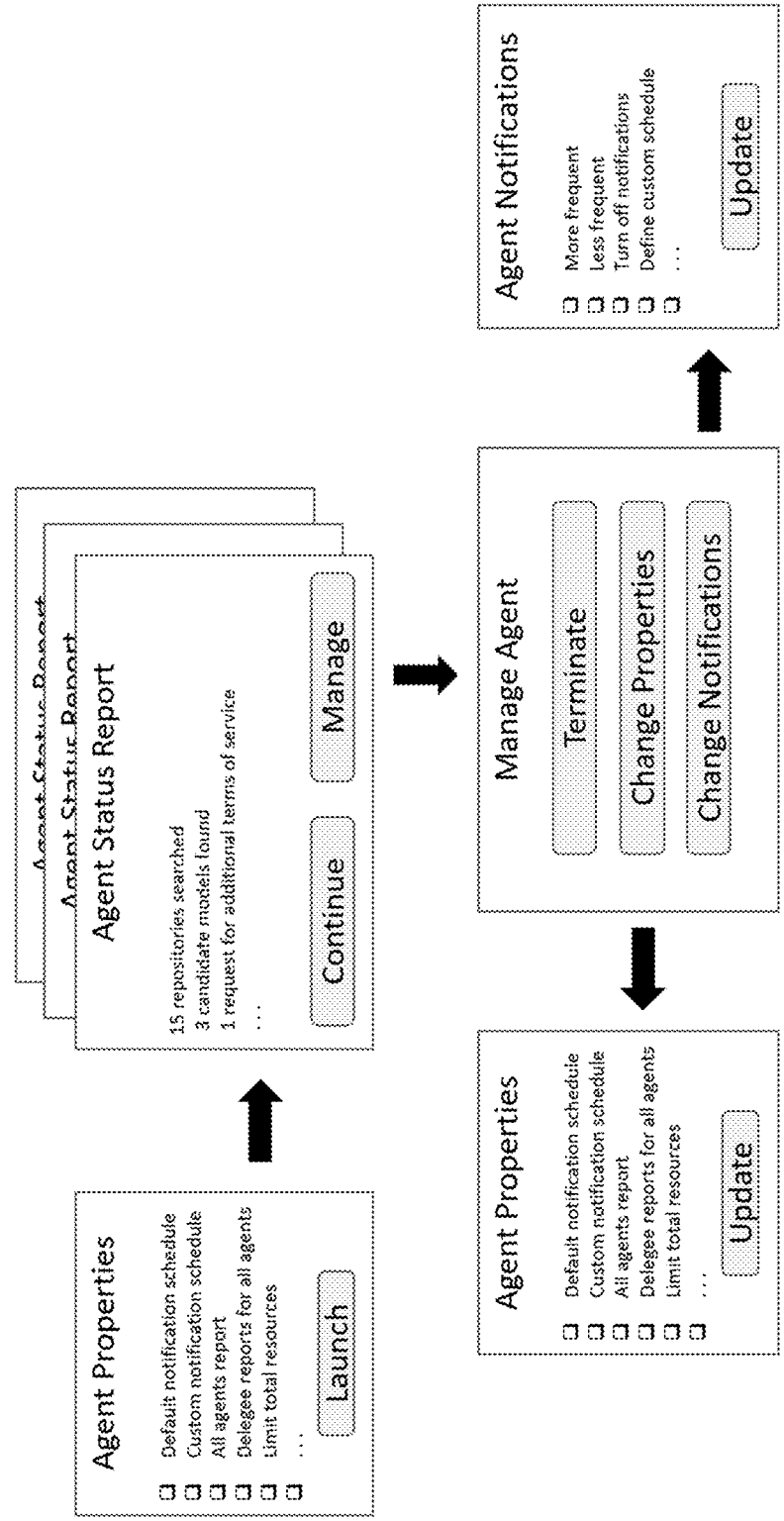
FIG. 3 exemplarily depicts conceptual user experience (UX) elements according to an embodiment of the present invention.

With reference to FIGS. 1-3 and as discussed later in more detail, in step 101, an autonomous agent is configured for a task. For example, target ranges for acceptable transaction amounts may be set for an agent obtaining services, making purchase, or selling goods. Configuration by way of default settings and/or property dialogs is well known in the art.

In step 102, the autonomous agent is launched with an initial update interval, this interval determining the initial frequency of the autonomous agent reporting results to a human user for review That is, an agent(s) is launched with initial update interval determined by specified properties, past behavior, aspects of computational context, etc.

Consider the following exemplary approach to determining the initial update interval First, a target value is selected by default. For a task that is expected to run for multiple hours, this initial interval is set to 1 hour. For a task that is expected to run for multiple days, this initial interval is set to 1 day. If there is no further information about additional factors including the human user's preferences, the value of agent results, the risk of agent failure, the nature of the computational domain within which the agent will be running, etc., the agent is launched with this initial interval. If additional information is available, it may be used to either decrease or increase the initial interval. For example, high risk of agent failure, high value of agent results, or unfamiliarity of computational domain, alone or in combination, may decrease the initial interval, with each factor reducing the interval by a default amount which might be set at 15% per factor. Conversely, low risk of agent failure, low value of agent results, or familiarity of computational domain, alone or in combination, may increase the initial interval by a default amount which might be set at 15% per factor. More complex algorithms for adjusting this interval are also possible and easily envisioned by those skilled in the art.

In step 103, a trust level of human user in a performance of the autonomous agent is measured. That is, trust is monitored based on interpretation of multiple user (and optionally agent) signals, analysis of past agent behavior, analysis of past and current computational context, etc.

Consider the following exemplary approach to measuring the trust level of a human user. Start with a default value of 50 on a hundred-point scale, where 0 is minimum trust and 100 is maximum trust. If the human user requests an immediate update during an interval between automatically-scheduled updates the trust level may be decreased by a default amount which might be set at 10%. Conversely, if the human user does not inspect the results presented during an automatically-scheduled update the trust level may be increased by a default amount which might be set at 10%. In another case, if the human user manually adjusts the update interval to be more frequent the trust level may be decreased by either the default value or by a value proportional to the magnitude of the manual adjustment. If the human user manually adjusts the update interval to be less frequent the trust level may be increased by either the default value or by a value proportional to the magnitude of the manual adjustment. More complex algorithms for adjusting this trust value are also possible and easily envisioned by those skilled in the art.

And, in step 104, the current update interval is adjusted based on the measured trust level. For example, the reporting interval may be increased based on evidence of increased trust or the reporting interval may be decreased based on evidence of decreased trust (e.g., see FIG. 2).

Via the method 100, long running agents automatically check back in with their human owner, providing status updates and/or intermediate results on a schedule designed to maximize trust while minimizing interruptions.

The update schedule set at agent launch may be based on a number of factors including owner familiarity with the agent's past behavior, similarity of computational domain to past domains, the human owner's risk tolerance, the human owner's computational or time budget, the criticality of the agent's results, general agent profile settings, etc. The update schedule can be a default schedule (e.g., out-of-box schedule) set by the provider and then adjusted by the human user for each specific agent. That is, weights are associated with each factor in the out-of-box schedule and the end user can adjust the weights based on their preference. This enables the invention to be used by those who are not skilled in adjusting the weights (i.e., less sophisticated end users) as well as those who want to adjust the weights for particular situations. For example, an-out-of box schedule can include an algorithm to weigh each of the factors, the algorithm shown as equation (1):

Then, the end user can adjust the algorithm as shown in equation (2):

The update schedule may also automatically changes with time with more frequent updates shortly after launch and less frequent updates as time goes on. This may be particularly useful for agents that have not be deployed before or for agents entering a computational domain unlike those previously encountered (e.g., an agent familiar with simple auctions entering a domain in which Dutch auctions are prevalent).

The inter-update interval may dynamically increase due to signals indicating an increase in owner trust. Such signals may include confirmation of correct agent behavior, shortness of time devoted to observation of reported results, the absence of requests for immediate status updates, etc.

The inter-update interval may also dynamically decrease due to signals indicating a reduction in owner trust, such signals including displeasure with agent behavior, lengthy reviews of reported results, requests for immediate status updates, etc.

In one embodiment, the human owner can adjust the default-reporting schedule through the setting of agent properties. Properties can apply to all agents or only a subset of agents based on characteristics of the agents or the agent's computational context.

The interval for the next update can be based on elapsed time, amount of computational resources consumed, number of successful actions, number of unsuccessful actions etc.

The update schedule for a new agent can be adjusted to require less frequent (or no) updates for tasks similar to those successfully run in the past (e.g., for a task that is launched once a week with the same parameters and the same computational context).

In another embodiment, the update schedule for a new agent can be automatically adjusted to require more frequent updates if the computational context is appreciably different (e.g., if a search formerly conducted on English language sites is now launched on Japanese language sites via a translator module).

The update schedule can be further adjusted dynamically based on agent-detected success indicators (e.g., number of highly rated search results, number of resources obtained at less than predicted costs etc.) if consistent with human owner's desires.

If multiple cooperating agents are involved in a shared task, then one of them may be designated to synthesize a status update on aggregate multi-agent behavior to minimize the overhead and complexity of understanding the collective state (as contrasted with each agent reporting individually).

With respect to FIG. 3, FIG. 3 depicts a conceptual user-experience (UX) elements for adjusting agent properties, launching agents, reviewing agent status reports from an update, further managing the agent in response to an update, and manually adjusting the agent update schedule for subsequent notifications.

Therefore, the method 100 improves over the conventional techniques by including a technique for autonomous agents providing updates to their human owner, adjusting how this is done, and automatically modifying agent-to-human notification schedule during long-running tasks. That is, no conventional technique includes the means to adjust autonomous agent notification frequency in order to simultaneously maximize trust by the agent's human owner while minimizing the overhead of monitoring agent behavior.

That is, research in agent trust is focused on agent to agent trust, or on manipulating the overall properties of an agent (e.g., emotional tone, knowledgeability) to increase trust in an agent by a human. Some conventional techniques focused on trust formation note that the impact of frequency of interactions with a (human) service provider is correlated with increased relationship strength early on but not after a more extended period. But, this relationship is not manipulated, it has not been applied to autonomous agents, and no dynamic adjustment is provided. Other conventional techniques in manipulating notification frequency allows for the setting of frequency by direct user means or by sensitivity to various factors including proximity (in time or space) and importance. Therefore, the method 100 improves on the prior art by including dynamic adjustment of notification frequency over time in relation to measured trust by the human user in the agent or agents.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating system, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 4, a computer system/server 12 is shown in the form general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
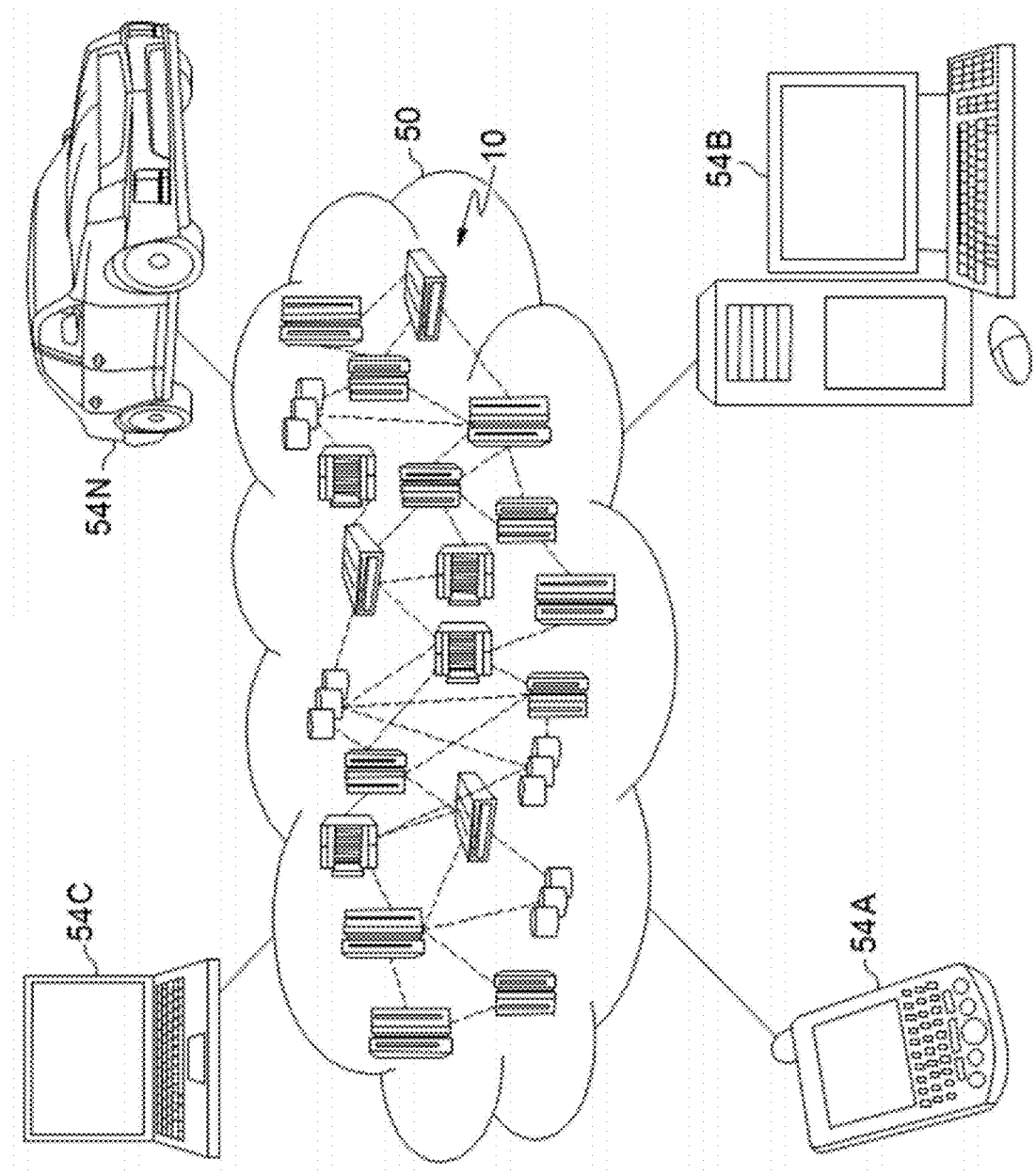
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
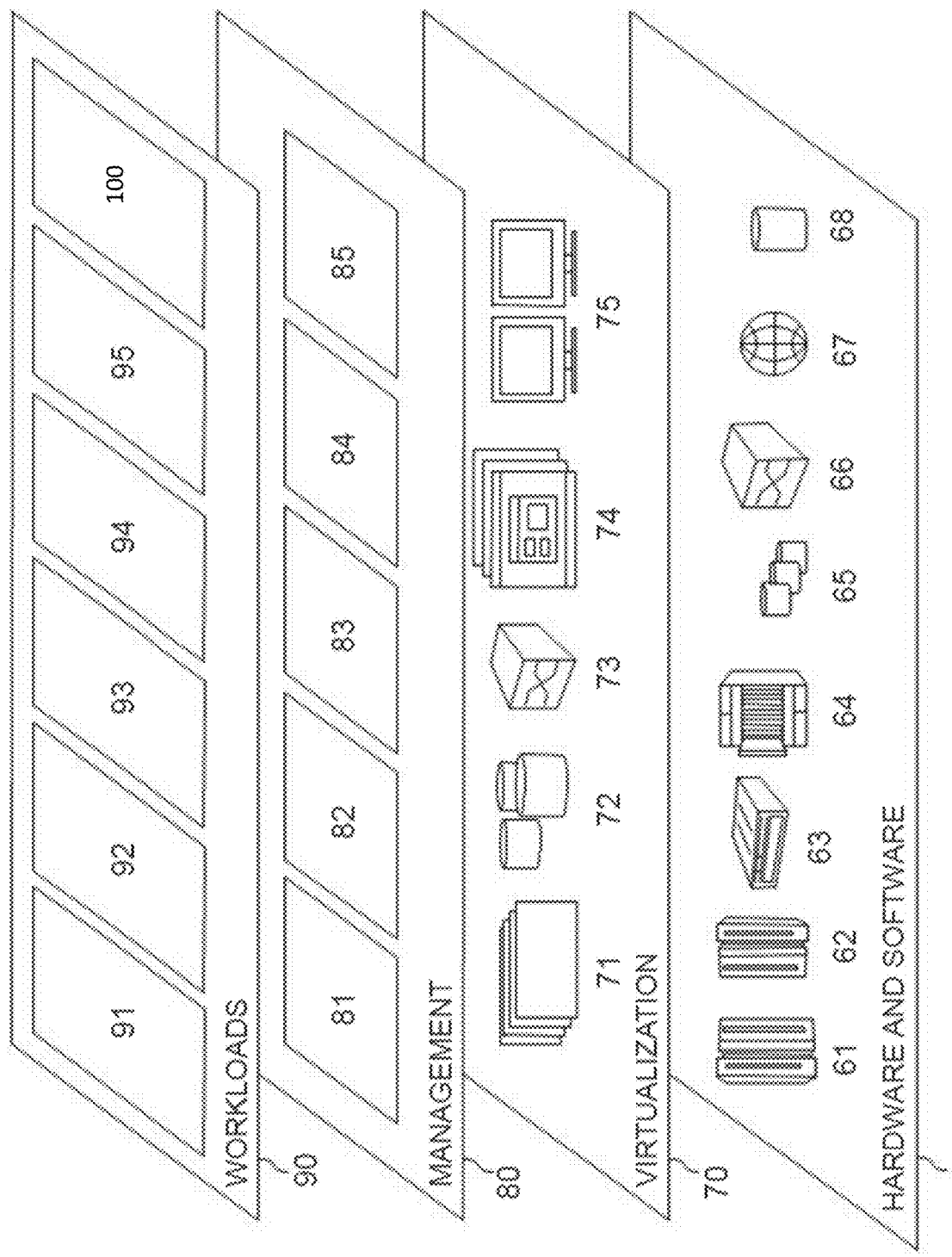
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an autonomous agent operating method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example; programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented autonomous agent operating method, the method comprising:
    configuring an autonomous agent for a task;
    launching the autonomous agent with an initial update interval, the initial update interval determining an initial frequency of the autonomous agent reporting results to a human user for review; and
    adjusting the initial update interval for a second autonomous agent based on a second task for the second autonomous agent being similar to the task over time in relation to a trust level of the human user in a performance of the autonomous agent that performed the review in the agent,
    wherein the update interval is dynamically adjusted in order to simultaneously maximize the trust by the human user while minimizing the overhead of monitoring behavior of the autonomous agent.

2. The method of claim 1, wherein the update interval is dynamically adjusted in order to simultaneously maximize the trust by the human user while minimizing an overhead of monitoring behavior of the autonomous agent.

3. The method of claim 1, wherein the initial update interval set at a launch of the agent is based on any of:
    an owner familiarity with a past behavior of the agent;
    a similarity of a computational domain to a past domain;
    a risk tolerance;
    a computational budget;
    a criticality of a result from the agent; and
    an agent profile setting.

4. The method of claim 1, wherein the update interval automatically changes with time with more frequent updates after launch and less frequent updates after a predetermined amount of time.

5. The method of claim 1, embodied in a cloud-computing environment, and
    wherein the update interval is dynamically increased due to signals indicating an increase in owner trust or dynamically decreased due to signals indicating a decrease in owner trust.

6. The method of claim 1, wherein the initial update interval is set for the second autonomous agent based on a similarity between the task of the autonomous agent and the second task of the second autonomous agent.

7. The method of claim 1, wherein the success rate is determined by the human user after the review.

8. A computer program product for autonomous agent operating, the computer program product comprising a computer-readable storage medium having program instructions embodied therewith, the program instructions executable by a computer to cause the computer to perform:
    configuring an autonomous agent for a task;
    launching the autonomous agent with an initial update interval, the initial update interval determining an initial frequency of the autonomous agent reporting results to a human user for review; and
    adjusting the initial update interval for a second autonomous agent based on a second task for the second autonomous agent being similar to the task over time in relation to a trust level of the human user in a performance of the autonomous agent that performed the review in the agent,
    wherein the update interval is dynamically adjusted in order to simultaneously maximize the trust by the human user while minimizing the overhead of monitoring behavior of the autonomous agent.

9. The computer program product of claim 8, wherein the initial update interval set at a launch of the agent is based on any of:
- an owner familiarity with a past behavior of the agent;
- a similarity of a computational domain to a past domain;
- a risk tolerance;
- a computational budget;
- a criticality of a result from the agent; and
- an agent profile setting.

10. The computer program product of claim 8, wherein the update interval automatically changes with time with more frequent updates after launch and less frequent updates after a predetermined amount of time.

11. An autonomous agent operating system, the system comprising:
- a processor; and
- a memory, the memory storing instructions to cause the processor to perform:
  - configuring an autonomous agent for a task;
  - launching the autonomous agent with an initial update interval, the initial update interval determining an initial frequency of the autonomous agent reporting results to a human user for review; and
  - adjusting the initial update interval for a second autonomous agent based on a second task for the second autonomous agent being similar to the task over time in relation to a trust level of the human user in a performance of the autonomous agent that performed the review in the agent,
- wherein the update interval is dynamically adjusted in order to simultaneously maximize the trust by the human user while minimizing the overhead of monitoring behavior of the autonomous agent.

12. The system of claim 11, wherein the initial update interval set at a launch of the agent is based on any of:
- an owner familiarity with a past behavior of the agent;
- a similarity of a computational domain to a past domain;
- a risk tolerance;
- a computational budget;
- a criticality of a result from the agent; and
- an agent profile setting.

13. The system of claim 11, wherein the update interval automatically changes with time with more frequent updates after launch and less frequent updates after a predetermined amount of time.

14. The system of claim 11, wherein the update interval is dynamically increased due to signals indicating an increase in owner trust or dynamically decreased due to signals indicating a decrease in owner trust.

* * * * *